United States Patent
Tsukamoto et al.

(10) Patent No.: US 8,513,851 B2
(45) Date of Patent: Aug. 20, 2013

(54) INSULATOR FOR MOTOR, STATOR, MOTOR AND COMPRESSOR

(75) Inventors: Satoshi Tsukamoto, Kusatsu (JP); Yasukazu Nabetani, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 356 days.

(21) Appl. No.: 12/528,100

(22) PCT Filed: Feb. 18, 2008

(86) PCT No.: PCT/JP2008/052634
§ 371 (c)(1), (2), (4) Date: Aug. 21, 2009

(87) PCT Pub. No.: WO2008/102721
PCT Pub. Date: Aug. 28, 2008

(65) Prior Publication Data
US 2010/0096945 A1    Apr. 22, 2010

(30) Foreign Application Priority Data
Feb. 23, 2007    (JP) .................. 2007-044297

(51) Int. Cl.
*H02K 3/34*    (2006.01)
(52) U.S. Cl.
USPC ....................................................... 310/215
(58) Field of Classification Search
USPC .................. 310/215, 216.115, 216
See application file for complete search history.

(56) References Cited

U.S. PATENT DOCUMENTS

| 4,217,690 | A | * | 8/1980 | Morreale ................. 29/596 |
| 4,765,054 | A | * | 8/1988 | Sauerwein et al. ........... 29/596 |
| 5,806,169 | A | * | 9/1998 | Trago et al. ................ 29/596 |
| 5,959,387 | A | * | 9/1999 | Mowery et al. ............... 310/198 |
| 6,414,413 | B1 | * | 7/2002 | Arai et al. ................... 310/214 |
| 6,590,310 | B2 | * | 7/2003 | Takano .................. 310/216.074 |
| 6,623,253 | B1 | * | 9/2003 | Onoda et al. ................ 417/366 |
| 7,944,109 | B2 | * | 5/2011 | Amano .................... 310/179 |
| 7,982,348 | B2 | * | 7/2011 | Hasegawa .................. 310/71 |
| 2002/0130580 | A1 | | 9/2002 | Arai et al. |
| 2007/0040461 | A1 | * | 2/2007 | Oohashi et al. ............. 310/71 |
| 2010/0096945 | A1 | * | 4/2010 | Tsukamoto et al. ......... 310/215 |
| 2011/0193444 | A1 | * | 8/2011 | Maruyama .................. 310/215 |
| 2011/0285240 | A1 | * | 11/2011 | Tsukamoto et al. ......... 310/215 |

FOREIGN PATENT DOCUMENTS

| EP | 1 713 157 A1 | 2/2005 |
| EP | 1 617 543 A2 | 1/2006 |
| JP | 01255452 | * 10/1989 |
| JP | 2001055979 | * 2/2001 |

(Continued)

OTHER PUBLICATIONS

European Search Report of corresponding EP Application No. 08 71 1458.3 dated Jun. 29, 2012.

*Primary Examiner* — Nguyen N Hanh
(74) *Attorney, Agent, or Firm* — Global IP Counselors (57) ABSTRACT

An insulator for a motor includes an annular section, a plurality of tooth sections and a plurality of connecting sections. The tooth sections extend radially inward of an inner circumferential surface of the annular section and are circumferentially arranged about the annular section. The connecting sections connect an inner circumferential surface of an annular section to ends of the tooth sections. Each connecting section includes a circumferential planar portion extending circumferentially from the end of a corresponding one of the tooth sections, and a radial planar portion extending radially from the end of the corresponding one of the tooth sections. Preferably, a stator includes a pair of the insulators, a motor includes the stator, and a compressor includes the motor.

6 Claims, 9 Drawing Sheets

(56) References Cited

FOREIGN PATENT DOCUMENTS

| JP | 2003299291 | * | 10/2003 |
| JP | 2003 324880 | * | 11/2003 |
| JP | 2003-324882 A | | 11/2003 |
| JP | 2005080418 | * | 2/2005 |
| JP | 2005-253286 A | | 9/2005 |
| JP | 2005-287240 A | | 10/2005 |
| JP | 2006-74943 A | | 3/2006 |

* cited by examiner

PRIOR ART

Fig.7

PRIOR ART

Fig.8

PRIOR ART

Fig.9

INSULATOR FOR MOTOR, STATOR, MOTOR AND COMPRESSOR

CROSS-REFERENCE TO RELATED APPLICATIONS

This U.S. National stage application claims priority under 35 U.S.C. §119(a) to Japanese Patent Application No. 2007-044297, filed in Japan on Feb. 23, 2007, the entire contents of which are hereby incorporated herein by reference.

TECHNICAL FIELD

This invention relates to an insulator for a motor used for a compressor of an air conditioner and a refrigerator, for example, a stator using the insulator, a motor using the stator, and a compressor using the motor.

BACKGROUND ART

Figure 7:
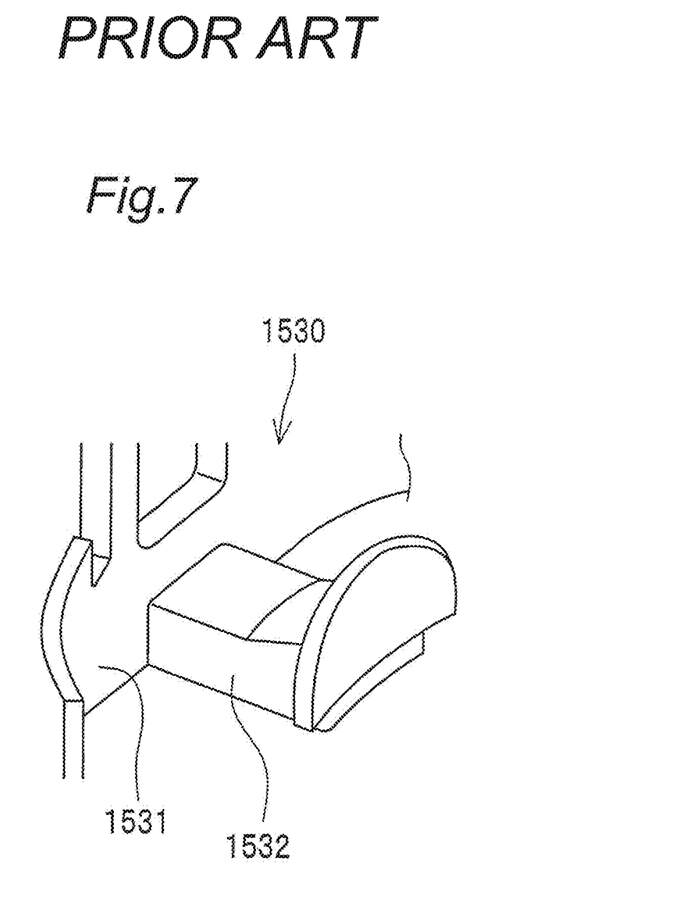
FIG. 7 is a partial perspective view of a conventional insulator.

A hitherto known insulator for a motor has an annular section 1531 and a plurality of tooth sections 1532 protruding radially inward from an inner circumferential surface of the annular section 1531 and arranged circumferentially, as shown in FIG. 7 (see JP 2005-287240 A).

Figure 8:
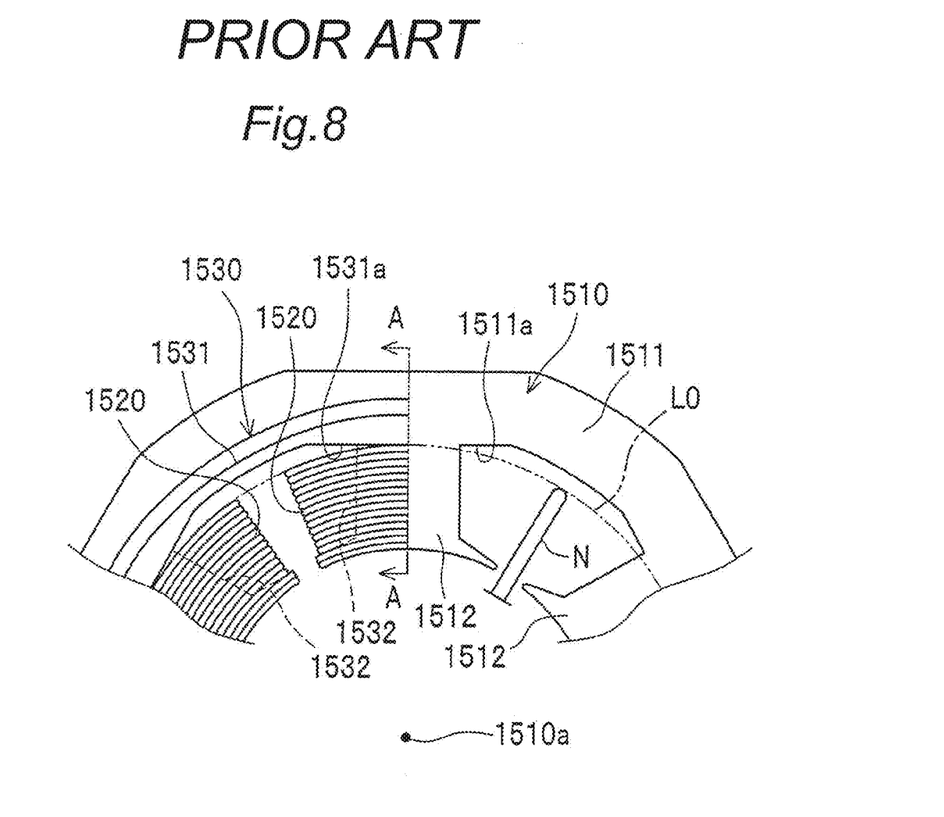
FIG. 8 is a plan view of a conventional stator.
Figure 9:
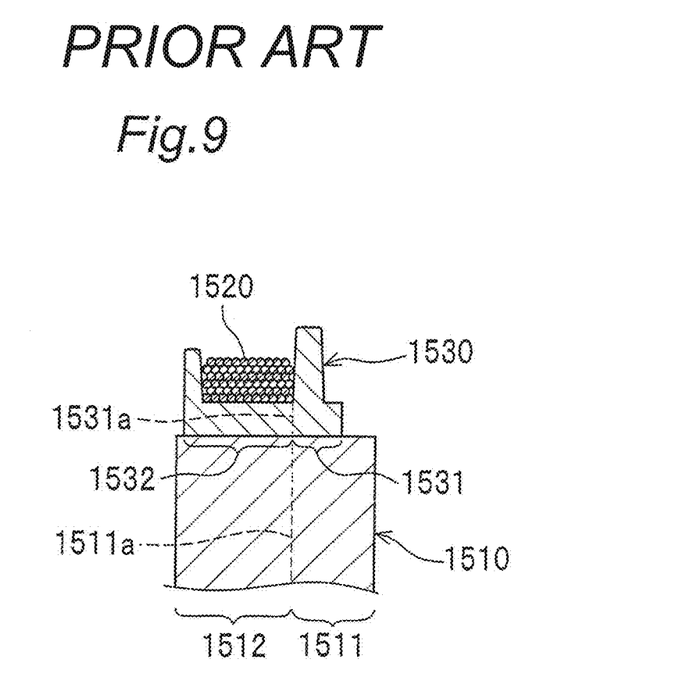
FIG. 9 is an A-A cross sectional view of FIG. 8.

As shown in FIG. 8 and FIG. 9, the insulators 1530 are disposed respectively facing both end surfaces in an axis 1510a direction of a stator core 1510, and the stator core 1510 and the insulators 1530 are wound together by a coil 1520. In FIG. 8, the coil 1520 and the insulator 1530 are partly omitted. FIG. 9 shows an A-A cross sectional view of FIG. 8.

The stator core 1510 includes a back yoke section 1511 and a plurality of tooth sections 1512 protruding radially inward from an inner circumferential surface of the back yoke section 1511 and arranged circumferentially.

SUMMARY OF INVENTION

Technical Problem

Each tooth section 1532 of the insulator 1530 is arranged in correspondence with each tooth section 1512 of the stator core 1510. Inner surfaces 1531a of the annular section 1531 of the insulator 1530 roughly coincide with inner surfaces 1511a of the back yoke section 1511 of the stator core 1510 as seen from an axis 1510a direction of the stator core 1510.

However, in the conventional insulator for a motor, the inner surfaces 1531a of the annular section 1531 of the insulator 1530 roughly coincide with the inner surfaces 1511a of the back yoke section 1511 of the stator core 1510, as seen from the axis 1510a direction of the stator core 1510. Therefore, if those portions of the inner circumferential surface of the back yoke section 1511 of the stator core 1510 that are in contact with the tooth sections 1512 of the stator core 1510 are radially inward of those portions of the inner circumferential surface of the back yoke section 1511 that are positioned between the adjacent tooth sections 1512 of the stator core 1510, a nozzle N of a coil winding machine for winding the coil 1520 is disadvantageously hindered by the inner circumferential surface of the annular section 1531 of the insulator 1530, so that a pathway of the nozzle N cannot be secured.

That is, when winding the coil 1520 around each of the tooth sections 1512, 1532, a tip of the nozzle N is hindered by the inner circumferential surface of the annular section 1531 of the insulator 1530 and can approach the back yoke section 1511 of the stator core 1510 only up to a position L0 shown in the two-dot chain line in FIG. 8, which has adversely affected a space factor of the coil 1520.

It is an object of the invention to provide an insulator for a motor which can secure enough space for a nozzle pathway of the coil winding machine and improve a space factor of the coil, a stator including the insulators, a motor including the stator, and a compressor including the motor.

Solution to Problem

In order to solve the problem, there is provided, according to an aspect of the invention, an insulator for a motor, which is adapted to be disposed facing either of two opposite end surfaces of a stator core of a stator of the motor, the end surfaces being located in an axis direction of the stator core, the stator being disposed radially outward of a rotor of the motor, and the insulator being adapted to be wound together with the stator core and another insulator disposed facing the other end surface of the stator core by a coil, comprising:

an annular section;

a plurality of tooth sections extending radially inward of an inner circumferential surface of the annular section and arranged circumferentially of the annular section; and connecting sections connecting the inner circumferential surface of the annular section to one end of the respective tooth sections, each connecting section including a circumferential planar portion extending circumferentially from the one end of a corresponding tooth section and a radial planar portion extending radially from the one end of the tooth section.

The insulator for a motor in accordance with this aspect of the present invention has the connecting sections connecting the inner circumferential surface of the annular section to the one end of the respective tooth sections, and each connecting section includes the circumferential planar portion that extends circumferentially from the one end of the tooth section and the radial planar portion that extends radially from the one end of the tooth section. Therefore, regarding the inner circumferential surface of the annular section, if a portion of the inner circumferential surface that is positioned radially outward of the one end of the tooth section is disposed radially inward of a portion of the inner circumferential surface that is positioned between the adjacent tooth sections, the nozzle of the coil winding machine for winding the coil will be able to move on the connecting section and thus is not hindered by the inner circumferential surface of the annular section.

Therefore, it is possible to secure a large enough pathway for the nozzle of the coil winding machine and improve the space factor of the coil.

In accordance with one aspect of the present invention, a surface of the connecting section opposite from a surface thereof that faces the end surface of the stator core is coplanar with a surface of the tooth section opposite from a surface thereof that faces the end surface of the stator core.

In the insulator for a motor in accordance with this aspect of the present invention, the surface of the connecting section on the side opposite to the surface thereof that faces the end surface of the stator core and the surface of the tooth section on the side opposite to the surface thereof that faces the end surface of the stator core are coplanar, i.e., on the same plane. Therefore, it is possible to surely secure the pathway of the nozzle and hence improve the space factor of the coil.

In accordance with one aspect of the present invention, an edge between a surface of the connecting section opposite from a surface thereof that faces the end surface of the stator core and an inner surface of the connecting section is formed in a convexly curved shape.

According to the insulator for a motor in accordance with this aspect of the present invention, the edge between the surface of the connecting section opposite from the surface thereof that faces the end surface of the stator core and the inner surface of the connecting section is shaped to have a convexly curved surface. Therefore, when winding the coil, even if the coil is brought into contact with the edge, because the edge is convexly curved, stress to be applied to the coil can be alleviated.

There is also provided, according to an aspect of the invention, a stator comprising:
 a stator core;
 the above-mentioned insulators which are disposed facing respective opposite end surfaces of the stator core, said opposite end surfaces being located in an axis direction of the stator core; and
 a coil wound around the stator core and the insulators, wherein
 the stator core comprises a back yoke section and a plurality of tooth sections protruding radially inward of an inner circumferential surface of the back yoke section and arranged circumferentially of the back yoke section,
 the tooth sections of the insulators are disposed in correspondence with the respective tooth sections of the stator core, and
 an inner surface of each connecting section of the insulators roughly coincides with an inner surface of the back yoke section of the stator core, as seen from the axis direction of the stator core.

According to the stator in accordance with this aspect of the present invention, the tooth sections of the insulator are disposed in correspondence with the tooth sections of the stator core, and the inner surface of each connecting section of the insulator roughly coincides with the inner surface of the back yoke section of the stator core as seen from the axis direction of the stator core. Therefore, regarding the inner circumferential surface of the back yoke section of the stator core, if a portion thereof that is in contact with a tooth section of the stator core is disposed radially inward of a portion thereof which is positioned between the adjacent tooth sections of the stator core, the nozzle will be able to move on the connecting section of the insulator and is thus not hindered by the inner circumferential surface of the annular section of the insulator.

Therefore, it is possible to secure a large enough pathway for the nozzle and possible to improve the space factor of the coil.

In accordance with one aspect of the present invention, the back yoke section of the stator core includes cutout surfaces in its outer periphery, radially outward of the tooth sections of the stator core, each cutout surface being formed by cutting out the stator core along the axis of the stator core, and cutout parallel surfaces in its inner periphery, radially outward of the tooth sections of the stator core, each cutout parallel surface being formed parallel to the cutout surface. And, the inner surfaces of the connecting sections of the insulators roughly coincide with the respective cutout parallel surfaces of the back yoke section of the stator core, as seen from the axis direction of the stator core.

According to the stator in accordance with this aspect of the present invention, the inner surfaces of the connecting sections of the insulator roughly coincide with the cutout parallel surfaces of the back yoke section of the stator core, as seen from the axis direction of the stator core. Therefore, regarding the inner circumferential surface of the back yoke section of the stator core, the cutout parallel surfaces are positioned radially inward of portions of the inner circumferential surface which are positioned between the adjacent tooth sections of the stator core. However, the nozzle of the coil winding machine is able to move on the connecting section of the insulator and is thus not hindered by the inner circumferential surface of the annular section of the insulator.

A motor in accordance with an aspect of the present invention includes a rotor, and the above-mentioned stator disposed radially outward of the rotor.

According to the motor in accordance with this aspect of the present invention, since the above-mentioned stator is included in the motor, an increased space factor of the coil is obtained and an improvement in performance is achievable.

A compressor in accordance with an aspect of the present invention comprises a closed container, a compression element disposed in the closed container, and the above-mentioned motor disposed in the closed container to drive the compression element through a shaft.

According to the compressor in accordance with this aspect of the present invention, since the motor is included in the compressor, the space factor of the coil is large and an improvement in performance is achievable.

Advantageous Effects of Invention

With the insulator that has the connecting section connecting the inner circumferential surface of the annular section to one end of the respective tooth sections, and each connecting section includes the circumferential planar portion that extends circumferentially from the one end of the tooth section and the radial planar portion that extends radially from the one end of the tooth section, it is possible to secure a large enough pathway for the nozzle of the coil winding machine and improve the space factor of the coil.

With the stator in which the tooth sections of the insulator are disposed in correspondence with the tooth sections of the stator core, and the inner surface of each connecting section roughly coincides with the inner surface of the back yoke section of the stator core as seen from the axis direction of the stator core, it is possible to secure a large enough pathway for the nozzle and possible to improve the space factor of the coil.

With the motor in which such a stator is included in the motor, the space factor of the coil is large and an improvement in performance can be achieved.

With the compressor in which such a motor is included in the compressor, the space factor of the coil is large and an improvement in performance can be achieved.

DESCRIPTION OF EMBODIMENTS

The invention will hereinafter be described in detail by embodiments illustrated.

Figure 1:
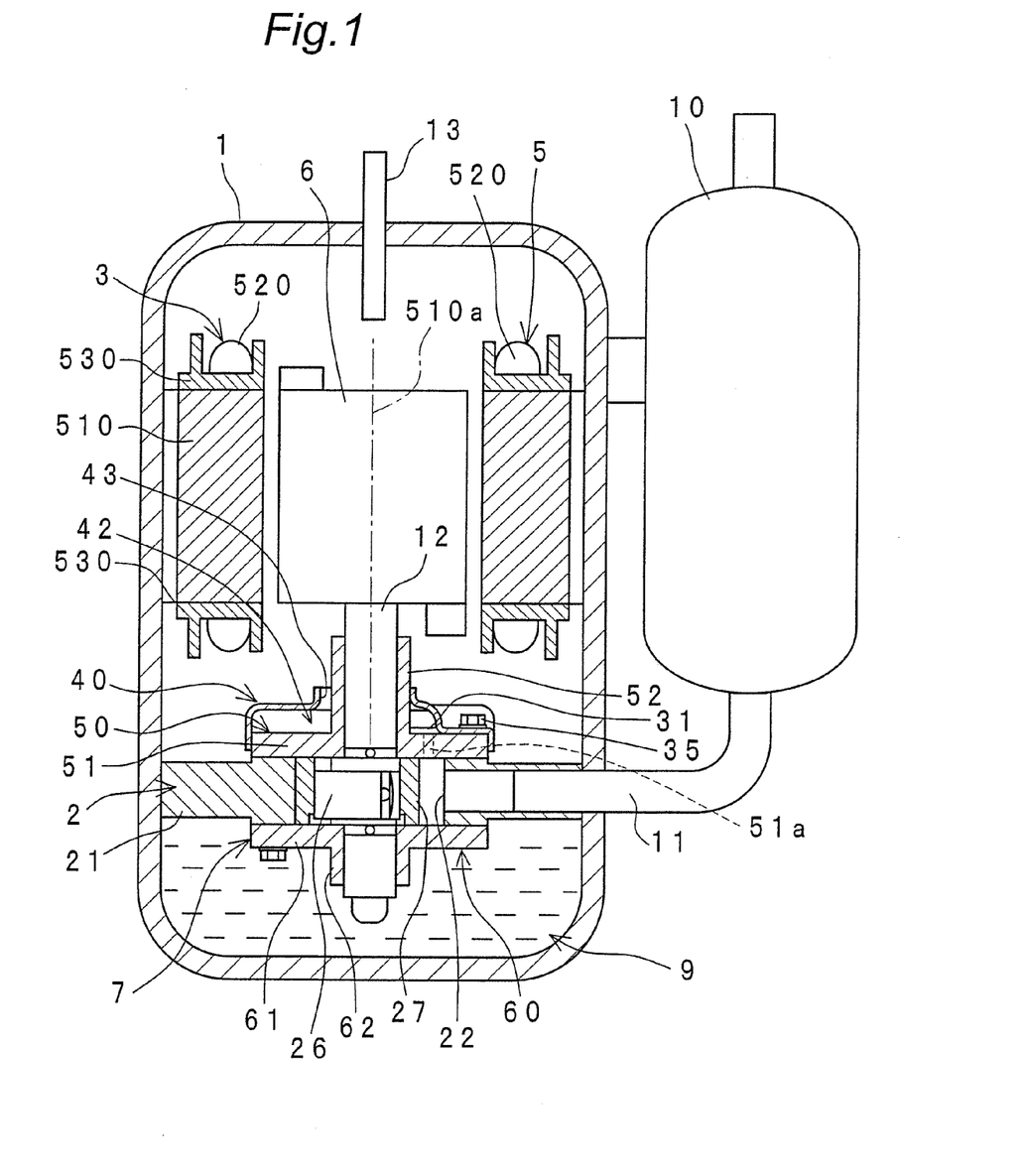
FIG. 1 is a longitudinal cross sectional view showing one embodiment of the compressor according to the present invention.

FIG. 1 is a longitudinal cross sectional view of one embodiment of the compressor according to this invention. The compressor includes a closed container 1, a compression element 2 disposed in the closed container 1, and a motor 3 disposed in the closed container 1 and arranged and configured to drive the compression element 2 through a shaft 12.

The compressor is a so-called longitudinal high-pressure dome type rotary compressor. In the closed container 1, the compression element 2 is disposed at a lower part, while the motor 3 is disposed at an upper part. The compression element 2 is configured to be driven by a rotor 6 of the motor 3 through the shaft 12.

The compression element 2 sucks a refrigerant gas from an accumulator 10 through a suction pipe 11. The refrigerant gas is obtained by controlling a condenser, an expansion mechanism and an evaporator, which are not shown and which, together with the compressor, make up an air conditioner as one example of a refrigerating system. This refrigerant is, for example, $CO_2$, HC, HFC such as R410A, or HCFC such as R22.

The compressor discharges a compressed high-temperature high-pressure gas from the compression element 2 so as to fill the inside of the closed container 1. Also, the compressed high-temperature high-pressure gas is passed through a clearance between a stator 5 and the rotor 6 of the motor 3 to cool the motor 3 and is then discharged to the outside through a discharge pipe 13 provided on an upper side of the motor 3.

An oil reservoir 9 in which a lubricant is stored is formed at a lower portion of a high pressure region in the closed container 1. The lubricant passes through an oil passage (not shown) provided in the shaft 12 from the oil reservoir 9, and moves to sliding portions such as of the compression element 2 and bearings of the motor 3 to lubricate the sliding portions. The lubricant is, for example, a polyalkylene glycol oil (such as polyethylene glycol, polypropylene glycol, etc.), an ether oil, an ester oil or a mineral oil.

The compression element 2 includes a cylinder 21 mounted to an inner surface of the closed container 1, an upper-side end plate member 50 and a lower-side end plate member 60, which are attached to upper and lower open ends, respectively, of the cylinder 21. The cylinder 21, the upper-side end plate member 50, and the lower-side end plate member 60 define a cylinder chamber 22.

The upper-side end plate member 50 includes a circular plate shaped body section 51 and a boss section 52 provided upward at the center of the body section 51. The shaft 12 is inserted through the body section 51 and the boss section 52.

The body section 51 is provided with a discharge opening 51a that communicates with the cylinder chamber 22. A discharge valve 31 is attached to the body section 51 so as to be positioned on a side opposite to the cylinder 21 relative to the body section 51. The discharge valve 31 is a reed valve, for example, and opens and closes the discharge opening 51a.

A cup shaped muffler cover 40 is attached to the body section 51 on the side opposite from the cylinder 21 in a manner so as to cover the discharge valve 31. The muffler cover 40 is fixed to the body section 51 by a fixing member 35 (such as bolts). The boss section 52 is inserted through the muffler cover 40.

The muffler cover 40 and the upper-side end plate member 50 define a muffler chamber 42. The muffler chamber 42 and the cylinder chamber 22 are allowed to communicate with each other via the discharge opening 51a.

The muffler cover 40 has an opening 43. The opening 43 brings the muffler chamber 42 into communication with an outside of the muffler cover 40.

The lower-side end plate member 60 has a circular plate shaped body section 61 and a boss section 62 provided downward at the center of the body section 61. The shaft 12 is inserted through the body section 61 and the boss section 62.

In short, one end portion of the shaft 12 is supported by the upper-side end plate member 50 and the lower-side end plate member 60. That is, the shaft 12 is a cantilever shaft. One end portion (supported end portion) of the shaft 12 (supported end side) goes into the inside of the cylinder chamber 22.

The supported end portion of the shaft 12 is provided with an eccentric pin 26, which is positioned in the cylinder chamber 22 on the compression element 2 side. The eccentric pin 26 is fitted in a roller 27. The roller 27 is disposed so as to be revolvable in the cylinder chamber 22, and a compressive action is exerted by the revolving movement of the roller 27.

In other words, the one end portion of the shaft 12 is supported by a housing 7 of the compression element 2 on both sides of the eccentric pin 26. The housing 7 includes the upper-side end plate member 50 and the lower-side end plate member 60.

Next, the compressive action of the cylinder chamber 22 will be described.

Figure 2:
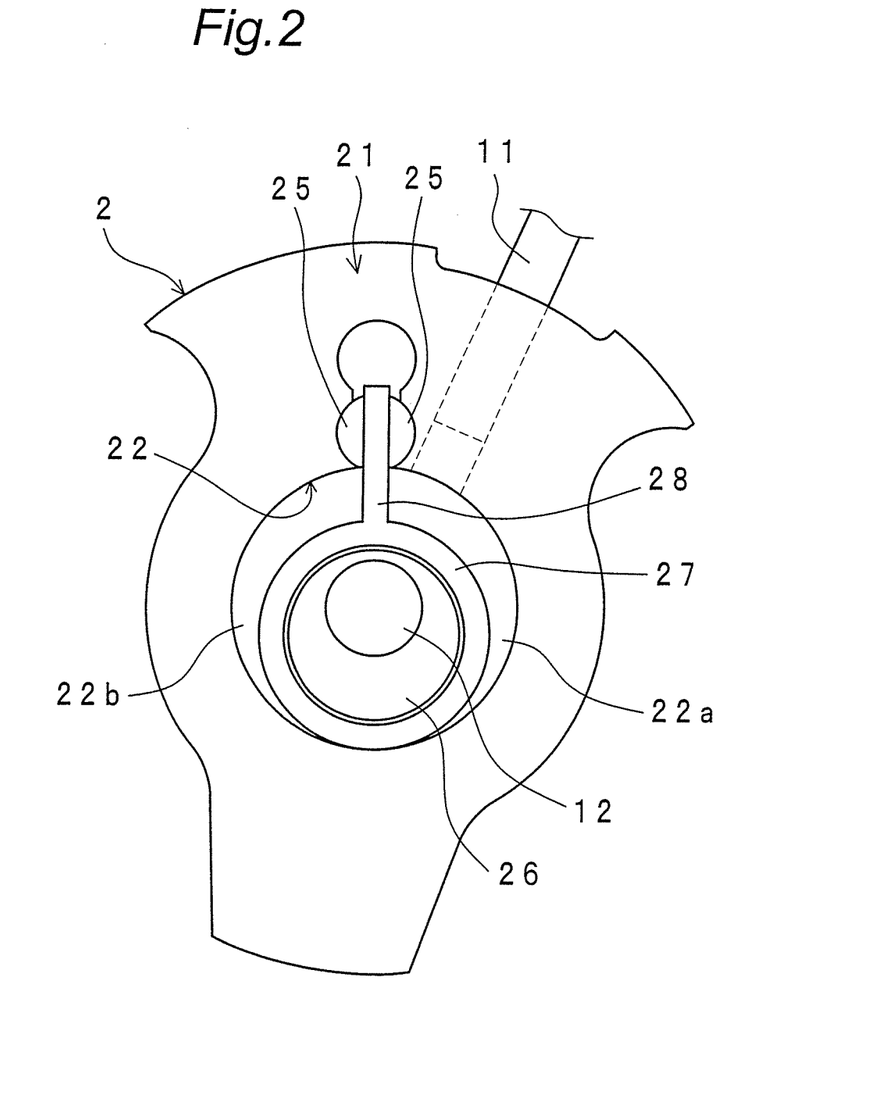
FIG. 2 is a plan view of essential portions of the compressor.

As shown in FIG. 2, the inside of the cylinder chamber 22 is partitioned by a blade 28 provided integrally with the roller 27. That is, a section on the right hand side of the blade 28 of the cylinder chamber 22, to which the suction pipe 11 is open, forms a suction chamber (low-pressure chamber) 22a. On the other hand, a section on the left hand side of the blade 28 of the cylinder chamber 22, to which the discharge opening 51a (shown in FIG. 1) is open, forms a discharge chamber (high-pressure chamber) 22b.

Semicircular cylinder shaped bushes 25, 25 are firmly attached to both surfaces of the blade 28 to perform sealing. Lubrication is performed between the blade 28 and the bushes 25, 25 with the lubricant.

The eccentric pin 26 eccentrically rotates together with the shaft 12, and the roller 27 fitted over the eccentric pin 26 revolves with an outer circumferential surface of the roller 27 in contact with an inner circumferential surface of the cylinder chamber 22.

With the revolution of the roller 27 in the cylinder chamber 22, the blade 28 moves back and forth with its both sides held by the bushes 25, 25. Then, a low-pressure refrigerant gas is sucked into the suction chamber 22a through the suction pipe 11, and compressed in the discharge chamber 22b so as to have a high pressure. After that, a high-pressure refrigerant gas is discharged from the discharge opening 51a (shown in FIG. 1).

Thereafter, as shown in FIG. 1, the refrigerant gas discharged from the discharge opening 51a is discharged through the muffler chamber 42 to the outside of the muffler cover 40.

Figure 3:
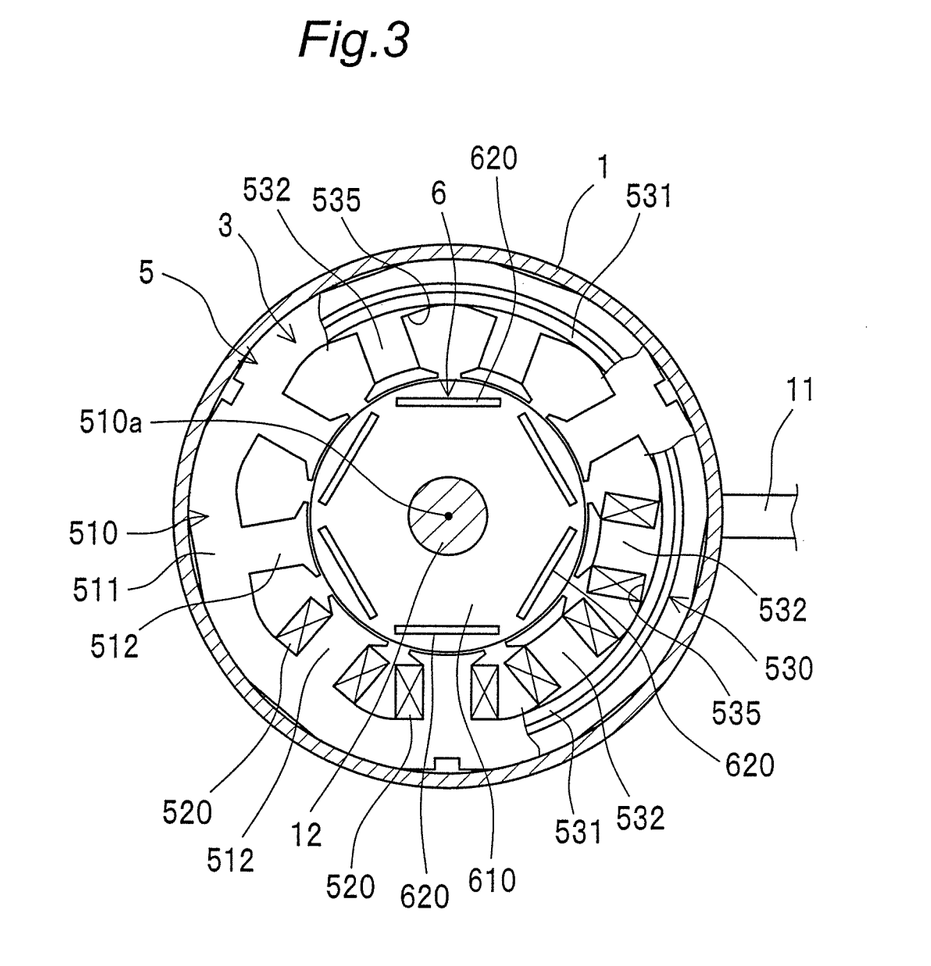
FIG. 3 is a transverse cross sectional view of the compressor in a region of a motor.

As shown in FIG. 1 and FIG. 3, the motor 3 includes the rotor 6 and the stator 5 disposed radially outward of the rotor 6 with an air gap therebetween.

The rotor 6 includes a rotor body 610 and magnets 620 embedded in the rotor body 610. The rotor body 610 has a cylindrical shape and is formed of stacked electromagnetic steel plates, for example. The shaft 12 is fitted into a central bore in the rotor body 610. Each of the magnets 620 is a flat plate-shaped permanent magnet. The six magnets 620 are arranged circumferentially of the rotor body 610 at equal center angle intervals.

The stator 5 includes a stator core 510, two insulators 530 disposed facing respective opposite axial (in an axis 510a direction) end surfaces of the stator core 510, and coils 520 wound around the stator core 510 and the insulators 530. In FIG. 3, the coils 520 and the insulator 530 are partly omitted.

The stator core 510 is formed of a plurality of stacked steel plates, for example, and is fitted into the closed container 1 by shrink fitting or the like. The stator core 510 has a cylindrical shaped back yoke section 511 and nine tooth sections 512 protruding radially inward from an inner circumferential surface of the back yoke section 511 and arranged circumferentially of the back yoke section 511 at equal intervals.

The coils 520 is wound by a so-called concentrated winding method in which coils are wound around respective ones of the tooth sections 512 and a coil is not routed between a plurality of tooth sections 512. The motor 3 is a so-called 6-pole, 9-slot motor. The rotor 6 is rotated together with the shaft 12 by an electromagnetic force generated in the stator 5 by passing an electrical current through the coil 520.

Each insulator 530 is interposed between the stator core 510 and the coils 520 so as to insulate the stator core 510 from the coils 520. The insulators 530 are molded by a resin. The insulators 530 may be made of a resin material having good heat resistance such as a liquid crystal polymer (LCP), a polybutylene terephthalate (PBT), a polyphenylene sulfide (PPS), a polyimide and a polyester. Further, the insulators 530 may be made of, for example, a material containing a glass fiber for improving strength.

Figure 4A:
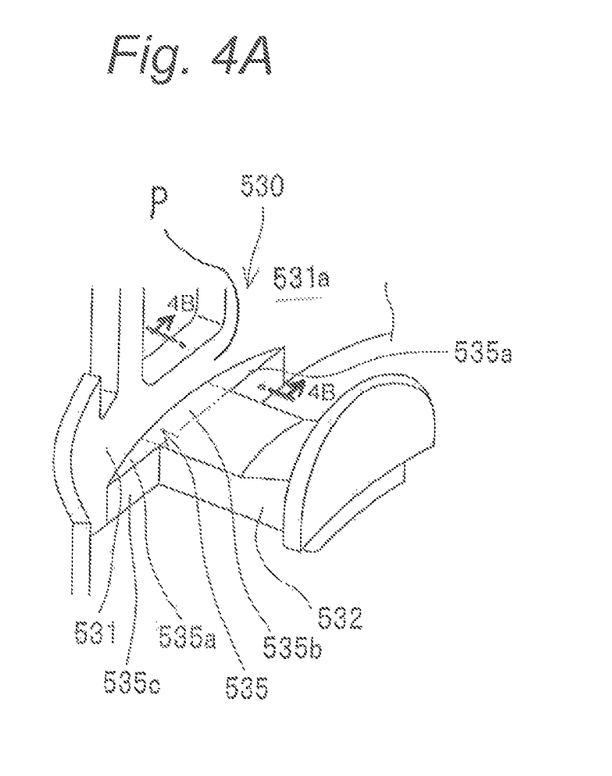
FIG. 4A is a partial perspective view of an insulator.

As shown in FIG. 3 and FIG. 4, each insulator 530 includes an annular section 531, a plurality of tooth sections 532 extending radially inward of an inner circumferential surface 531a of the annular section 531 and arranged circumferentially of the annular section 531 at roughly equal intervals, and connecting sections 535 which connect the inner circumferential surface 531a of the annular section 531 to one end of the respective tooth sections 532.

Each connecting section 535 includes circumferential planar portions 535a that extend circumferentially from the one end of the tooth section 532 and coplanarly with the tooth section 532, and a radial planar portion 535b that extends radially from the one end of the tooth section 532 and coplanarly with the tooth section 532.

Figure 4B:
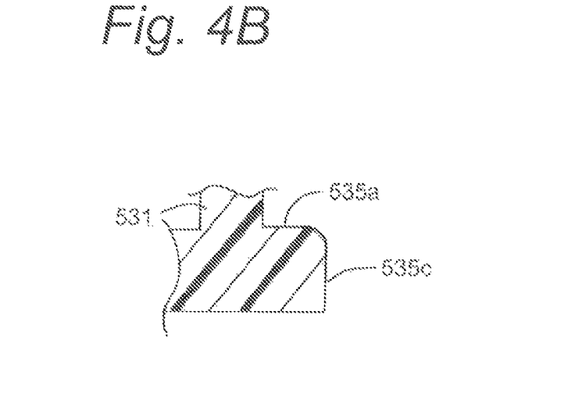
FIG. 4B is a partial cross-sectional view of the insulator illustrated in FIG. 4A, as seen along section line 4B-4B of FIG. 4A.
Figure 6:
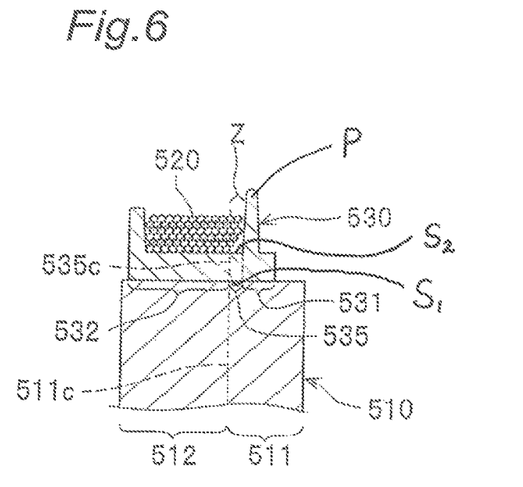
FIG. 6 is an A-A cross sectional view of FIG. 5.

A (second) surface $S_2$ of the connecting section 535 on a side opposite from a (first) surface $S_1$ thereof that faces an axial end surface of the stator core 510 is coplanar with a surface of the tooth section 532 on a side opposite from a surface thereof that faces the end surface of the stator core 510 as seen in FIG. 6. The annular section 531 has a projecting portion P extending in the axial direction thereof in a position abutting the second surface $S_2$ of at least one of the connecting sections 535. The projecting portion P entirely delimits the at least one connecting section 535 on a radially outer side thereof. See FIG. 4.

Although an edge between the surface of the connecting section 535 on the side opposite from the surface thereof that faces the end surface of the stator core 510 and an inner surface 535c of the connecting section 535 is formed in an angular shape, it may be formed in a convexly curved shape or chamfered.

Figure 5:
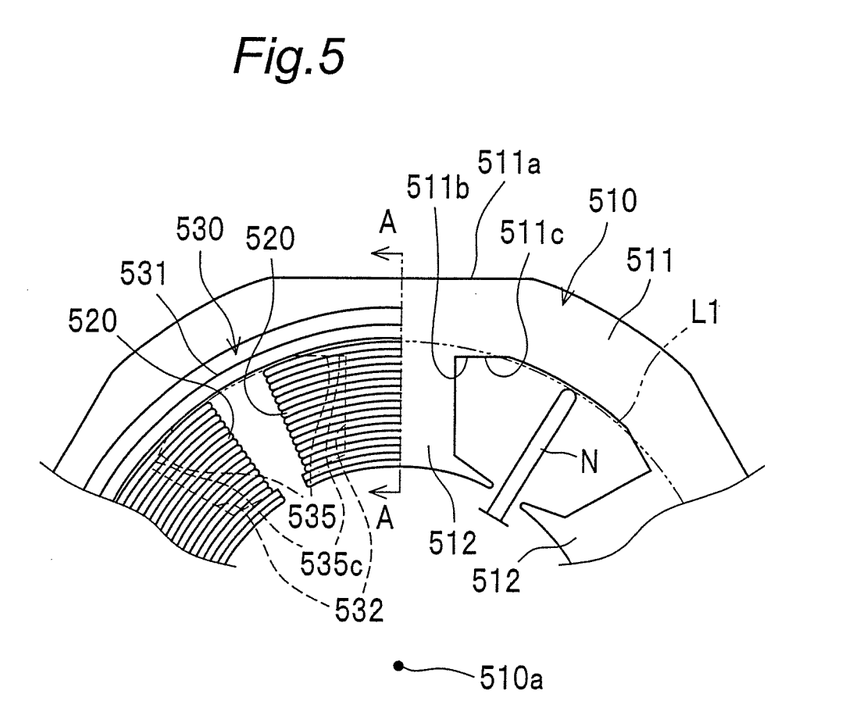
FIG. 5 is a plan view of a stator.

As shown in FIG. 5 and FIG. 6, the tooth sections 532 of the insulator 530 are disposed in correspondence with the tooth sections 512 of the stator core 510, and the inner surfaces 535c of each connecting section 535 of the insulator 530 roughly coincide with inner surfaces 511c of the back yoke section 511 of the stator core 510, as seen from the axis 510a direction of the stator core 510. In FIG. 5, the coils 520 and the insulator 530 are partly omitted. FIG. 6 is an A-A cross sectional view of FIG. 5.

The annular section 531 of the insulator 530 faces and is in contact with the back yoke section 511 of the stator core 510, and the tooth sections 532 of the insulator 530 face and are in contact with the respective tooth sections 512 of the stator core 510.

The tooth sections 512 of the stator core 510 and the tooth sections 532 of the insulator 530 have roughly the same shape, as seen from the axis 510a direction of the stator core 510.

The back yoke section 511 of the stator core 510 has cutout surfaces 511a in its outer periphery, radially outward of the tooth sections 512 of the stator core 510. The back yoke section 511 also has cutout parallel surfaces 511b in its inner periphery, radially outward of the tooth sections 512 of the stator core 510.

Each cutout surface 511a is formed by cutting out the stator core 510 along the axis 510a of the stator core 510. The cutout surface 511a defines a so-called core cut. Each cutout parallel surface 511b is formed parallel to the cutout surface 511a.

The inner surface 535c of the connecting section 535 of the insulator 530 roughly coincides with the cutout parallel surface 511b of the back yoke section 511 of the stator core 510 as seen from the axis 510a direction of the stator core 510.

As described, the insulator 530 with the above construction has the connecting sections 535 connecting the inner circumferential surface 531a of the annular section 531 to one end of the respective tooth sections 532, and each connecting section 535 includes the circumferential planar portions 535a that extend circumferentially from the one end of the tooth section 532, and the radial planar portion 535b that extends radially from the one end of the tooth section 532. Therefore, regarding the inner circumferential surface 531a of the annular section 531, even if a portion thereof that is positioned radially outward of the one end of the tooth section 532 is disposed radially inward of portions of the circumferential surface which are positioned between the adjacent tooth sections 532, the nozzle N of the coil winding machine for winding the coil 520 will be able to move on the connecting section 535 and thus is not hindered by the inner circumferential surface 531a of the annular section 531.

That is, when winding the coil 520 around the tooth sections 512 and 532, the tip of the nozzle N is not hindered by the inner circumferential surface of the annular section 531 of the insulator 530 and can approach the back yoke section 511 of the stator core 510 up to a position L1 shown in two-dot chain line in FIG. 5.

Therefore, it is possible to secure a large enough pathway for the nozzle N of the coil winding machine and improve the space factor of the coil 520. Specifically, in the present invention, as shown in FIG. 6, it is possible to increase turns of the coil 520 by a coil-turn increasing region Z, as compared with coil turns of the coil 1520 in the conventional example of FIG. 9.

Since the surface of the connecting section 535 on the side opposite to the surface thereof that faces the end surface of the stator core 510 and the surface of the tooth section 532 on the side opposite to the surface thereof that faces the end surface of the stator core 510 are on the same plane, it is possible to surely secure the pathway of the nozzle and hence improve the space factor of the coil 520.

It is preferred that the edge between the surface of the connecting section 535 on the side opposite to the surface thereof that faces the end surface of the stator core 510 and the inner surface 535c of the connecting section 535 is formed in a convexly curved shape. When winding the coil 520, even if the coil is brought into contact with the edge, because the edge is convexly curved, stress to be applied to the coil 520 is alleviated.

According to the stator 5 with the above construction, the tooth sections 532 of the insulator 530 is disposed in correspondence with the tooth sections 512 of the stator core 510, and the inner surface 535c of each connecting section 535 roughly coincides with the inner surface 511c of the back yoke section 511 of the stator core 510, as seen from the axis 510a direction of the stator core 510. Therefore, regarding the inner circumferential surface of the back yoke section 511 of the stator core 510, even if a portion (of the inner circumferential surface) which is in contact with a tooth section 512 of the stator core 510 is disposed radially inward of a portion (of the inner circumferential surface) which is positioned between adjacent tooth sections 512 of the stator core 510, the nozzle N is able to move on the connecting section 535 of the insulator 530 and is thus not hindered by the inner circumferential surface of the annular section 531 of the insulator 530.

Therefore, it is possible to secure an enough space for the nozzle N pathway and possible to improve the space factor of the coils 520.

The inner surfaces 535c of the connecting sections 535 of the insulator 530 roughly coincide with the cutout parallel surfaces 511b of the back yoke section 511 of the stator core 510, as seen from the axis 510a direction of the stator core 510. Therefore, regarding the inner circumferential surface of the back yoke section 511 of the stator core 510, the cutout parallel surface 511b, which is a portion of the inner circumferential surface, is disposed radially inward of a portion thereof which is positioned between adjacent tooth sections 512 of the stator core 510. However, the nozzle N of the coil winding machine moves on the connecting section 535 of the insulator 530 and is thus not hindered by the inner circumferential surface of the annular section 531 of the insulator 530.

According to the motor 3 with the above construction, due to the provision of the stator 5 therein, the space factor of the coils 520 is large and an improvement in performance is achievable.

In the compressor with the above construction, which has the motor 3, the space factor of the coils 520 is large and an improvement in performance is achievable.

This invention is not limited to the above-described embodiment. For example, the compression element 2 may be of a rotary type in which a roller and a blade are separated. Instead of the rotary type, the compression element 2 may be of a scroll type or a reciprocating type.

In addition, the compression element 2 may be of a two cylinder type having two cylinder chambers. Also, the compression element 2 may be disposed at the upper part, while the motor 3 may be disposed at the lower part. Furthermore, the motor may be used for a fan and the like other than the compressor.

The number of the tooth sections 532 of the insulator 530 and the number of the tooth sections 512 of the stator core 510 may be freely increased or decreased. That is, any pole and slot numbers may be applied other than the 6-pole 9-slot motor.

What is claimed is:

1. A stator comprising:
a pair of insulators, each insulator including
an annular section;
a plurality of tooth sections extending radially inward of a radially inner circumferential surface of the annular section and being circumferentially arranged about the annular section, and
a plurality of connecting sections connecting the radially inner circumferential surface of the annular section to ends of the tooth sections,
each connecting section having a first surface configured to face an end surface of a stator core and a second surface facing in a direction opposite to the first surface,
the second surface of each connecting section including
a circumferential planar portion extending circumferentially from the end of the corresponding one of the tooth sections, and
a radial planar portion extending radially from the end of the corresponding one of the tooth sections, and
the annular section having a projecting portion extending in the axial direction thereof in a position abutting the second surface of at least one of the connecting sections, the projecting portion entirely delimiting the at least one connecting section on a radially outer side thereof;
a stator core, with the insulators disposed facing respective opposite end surfaces of the stator core that are located in an axial direction of the stator core; and
a coil wound around the stator core and the insulators,
the stator core including a back yoke section and a plurality of tooth sections protruding radially inward of an inner circumferential surface of the back yoke section and circumferentially arranged about the back yoke section,
the tooth sections of the insulators being disposed in locations corresponding to locations of the tooth sections of the stator core, and
each connecting section of each of the insulators having an inner surface that roughly coincides with an inner surface of the back yoke section of the stator core, as seen from the axial direction of the stator core,
the back yoke section of the stator core including
a plurality of first cutout surfaces formed in an outer periphery thereof that is radially outward of the tooth sections of the stator core, with each cutout surface being formed along the axial direction of the stator core, and
a plurality of second cutout surfaces formed in an inner periphery thereof that is radially outward of the tooth sections of the stator core, and
the inner surfaces of the connecting sections of the insulators roughly coinciding with the second cutout surfaces of the back yoke section of the stator core, as seen from the axial direction of the stator core.

2. A motor including the stator according to claim 1, the motor further comprising:
a rotor, with the stator being disposed radially outward of the rotor.

3. A compressor including the motor according to claim 2, the compressor further comprising:
a closed container; and
a compression element disposed in the closed container,
the motor being disposed in the closed container to drive the compression element using a shaft.

4. The stator according to claim 1, wherein
the second surface of each connecting section is coplanar with a surface of a corresponding one of the tooth sections.

5. The stator according to claim 1, wherein
each connecting section further has an inner surface, and an edge formed between the inner surface and the second surface, and
the edge of each connecting section is formed in a convexly curved shape.

6. The stator according to claim 1, wherein
the circumferential planar portions of the connecting sections on opposite sides of each tooth section are parallel to each other.

* * * * *